United States Patent
Leiber et al.

[15] 3,637,264
[45] Jan. 25, 1972

[54] ANTILOCKING CONTROL FOR PRESSURE ACTUATED BRAKES

[72] Inventors: Heinz Leiber, Leimen; Anton Rodi, Karlsruhe, both of Germany

[73] Assignee: Teldix G.m.b.H., Heidelberg-Wieblingen, Germany

[22] Filed: Mar. 18, 1970

[21] Appl. No.: 20,511

[30] Foreign Application Priority Data

Mar. 22, 1969 Germany..................P 19 14 765.0

[52] U.S. Cl..........................303/21 BE, 188/181 A, 303/20, 303/61
[51] Int. Cl. ...............................................B60t 8/12
[58] Field of Search..................188/181; 235/150.3; 303/20, 303/21, 61; 307/115; 317/5; 324/162, 181; 328/59, 61, 65; 340/263

[56] References Cited

UNITED STATES PATENTS

| | | | |
|---|---|---|---|
| 3,499,689 | 3/1970 | Carp et al. | 303/21 P |
| 3,503,653 | 3/1970 | Davis et al. | 303/21 CF |
| 3,467,444 | 9/1969 | Leiber | 303/21 BE |
| 3,500,190 | 3/1970 | Michon | 324/262 |

Primary Examiner—Milton Buchler
Assistant Examiner—Stephen G. Kunin
Attorney—Spencer & Kaye

[57] ABSTRACT

The pressure of the brake-actuating fluid in an antilocking brake control system is varied by pulsing the control valve or valves for durations which are varied to be greater or lesser than the period of that limiting frequency above which the brake system can not respond. In the former case, a rapid increase in fluid pressure or a rapid decrease in fluid pressure occurs, whereas in the latter case, a less rapid average or net increase or decrease in fluid pressure to which the brake system responds occurs. These conditions are controlled in dependence on the rotational behavior of the vehicles wheel or wheels and more especially in dependence on predetermined changes in angular velocity of the wheel. Moreover, either variation in pulse duration at fixed frequency or variation in frequency at fixed pulse duration may be effected during high-frequency pulsing so as further to alter the net increase or decrease in fluid pressure. This further alteration is effected as a function of time from the beginning of the high-frequency pulsing.

14 Claims, 8 Drawing Figures

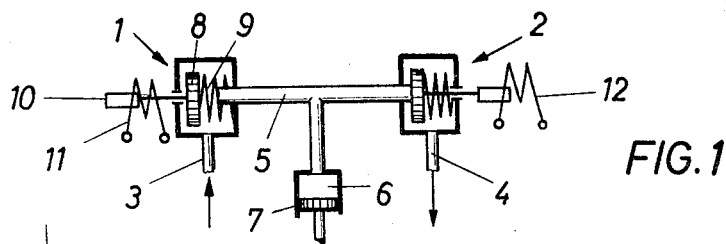
FIG.1
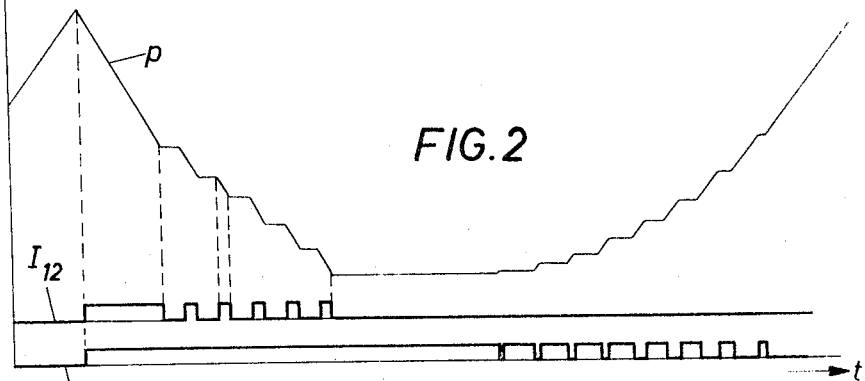
FIG.2
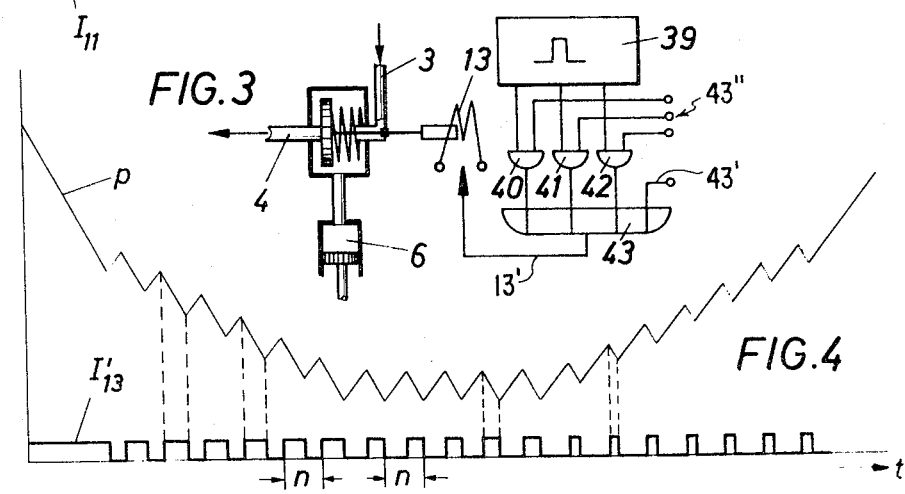
FIG.3
FIG.4
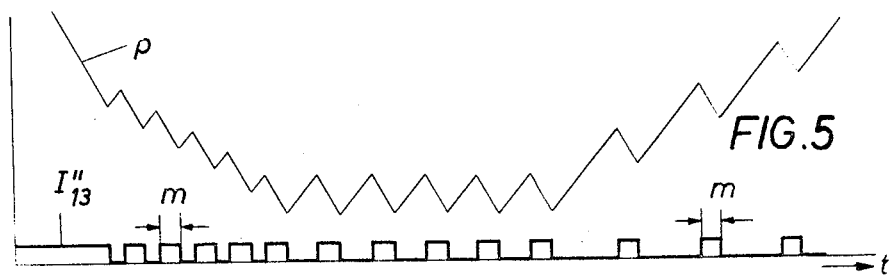
FIG.5

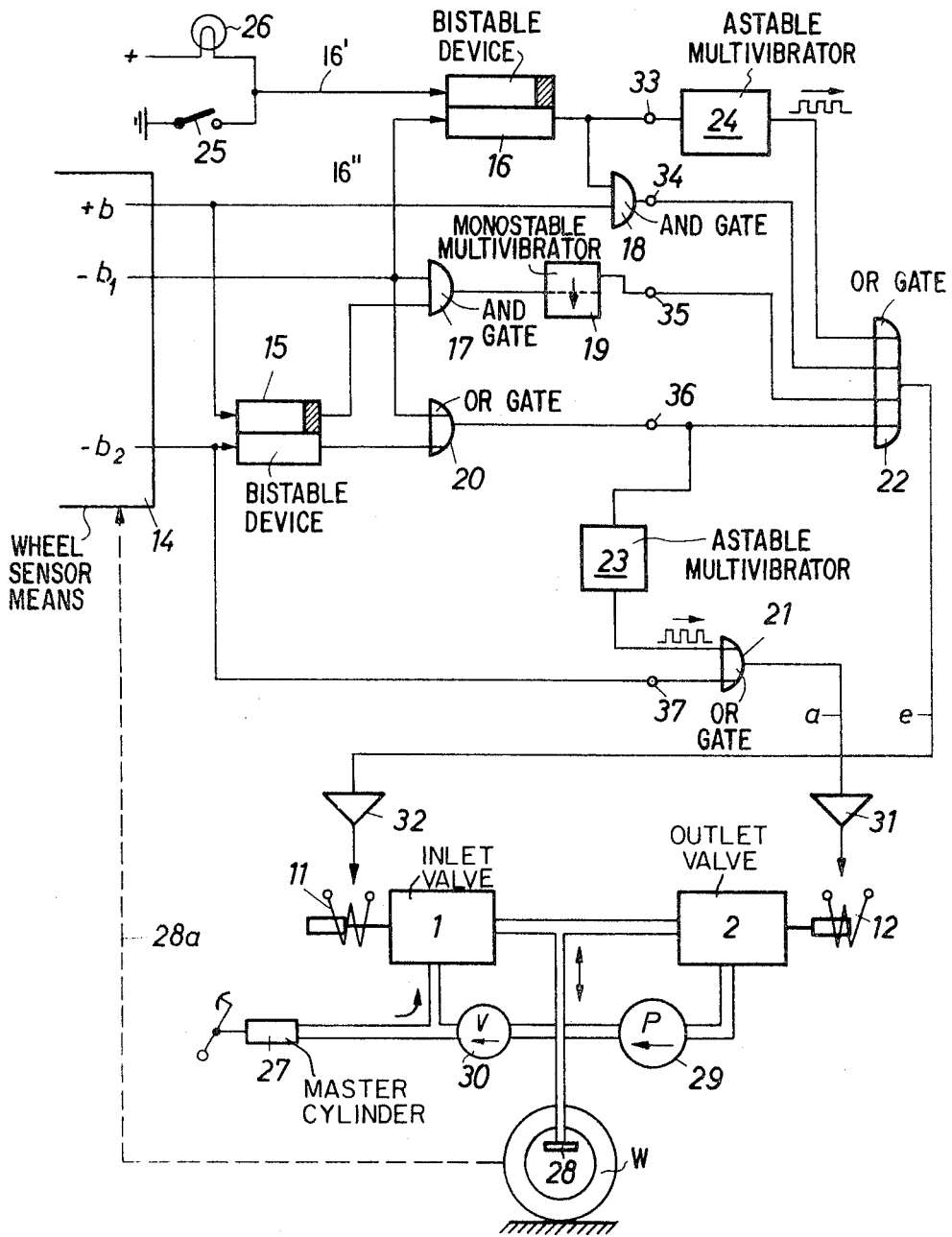

3,637,264

ANTILOCKING CONTROL FOR PRESSURE ACTUATED BRAKES

BACKGROUND OF THE INVENTION

Antilocking control systems for pressure actuated vehicle brakes are known, for example, which include a three-way value between the fluid pressure source, the wheel brake cylinder and an outlet for the wheel brake cylinder. This valve causes, in one position, a reduction in brake pressure and in the other position an increase in brake pressure. Systems are also known in which a normally open inlet valve is disposed between the pressure source and the wheel brake cylinder and a normally closed outlet valve is disposed between the wheel brake cylinder and return line or outlet therefor. In this latter case, three operating states of the valve are possible. In the normal state, brake pressure increases; when both valves are closed, it remains constant; and when the outlet valve is open, the pressure decreases. It is also known to provide a control system in which four operating states are possible, these states leading respectively to slowly and rapidly increasing fluid pressure and slowly and rapidly decreasing pressure. This is accomplished by means of a three-way valve and two additional valves in the pressure line and in the outlet line which serve the purpose of varying the flow cross section through these inlet and outlet lines. Such a system is disclosed, for example, in German Pat. No. DAS 1,166,012.

It becomes evident that in order to produce both rapid and less rapid increasing and decreasing actuating fluid pressure in known systems, an increased number of valves will be required. In systems employing electronic signal processing, and provided with the requisite electrical power amplifiers for actuating the valves, it will be appreciated that the manufacturing costs become increasingly large.

It is also known, e.g., U.S. Pat. No. 3,265,446, to have the brake pressure pulsate automatically to improve the braking effect and driving stability. This, however, is only a coarse imitation of that which experienced drivers do anyhow when they are in a crisis situation, i.e., pump the brakes. The frequency of the brake pressure pulsations, however, can not be varied in the known devices and is lower than the limit frequency of the response of the brake itself. This means that the braking moment produced by the brake can follow the brake pressure pulsations. The inert masses within the brake mechanism, as for example levers, brake pistons, etc., thus also oscillate at the frequency of the pressure pulsations. If these pulsations were faster than the limit frequency of the brake, such known devices would remain ineffective.

SUMMARY OF THE INVENTION

It is an object of the present invention to provide an antilocking control system for vehicle brakes which allows the brakes to be actuated by being subjected to different rates of pressure increase and decrease without requiring the complexity and expense of known systems.

More particularly, the present invention involves operating the control valve or valves for the braking system in a pulsed manner in which the pulse durations are controlled by various states of acceleration or deceleration of the associated vehicle wheel. When the pulse durations are relatively long, the pressure variation response of the braking system is relatively rapid, i.e., is of such a rate that the physical components of the braking system may follow or substantially follow or respond to such pressure variations. When the pulse durations are relatively short, the corresponding individual fluctuations in actuating fluid pressure are sufficiently rapid that they can not be effectively followed or responded to by the braking system. However, the braking system can follow the average or net increase or decrease in pressure so effected so that the braking system responds to pressure variations at a lower rate than in the case of relatively long duration pulses.

The pulsing operations may be variable as to frequency or as to absolute pulse duration for each pulse so that a continuously or progressively variable effective pressure increase or decrease is achieved.

Preferably, the high-frequency pulsing is effected by a suitable oscillator or current pulse generator operative response to only certain states or conditions of the sensing means which senses the rotationable behavior of the wheel or wheels. Either the pulse frequency or the pulse duration of the output of the pulse generator may be progressively varied from the inception of the signal output so as to produce progressively varying effective pressure changes.

BRIEF DESCRIPTION OF THE DRAWINGS

FIG. 1 is a diagrammatic view showing one type of pressure control system for vehicular pressure actuated brakes.

FIG. 2 is a diagram associated with FIG. 1 showing the course of pressure and control pulses of the inlet and outlet valves of FIG. 1 plotted vs. time.

FIG. 3 is a diagrammatic view illustrating the conventional form of three-way valve for pressure actuated brakes and associated circuitry according to the present invention.

FIG. 4 is a diagram associated with FIG. 3 illustrating the pressure response curve and the initiating valve-pulsing current producing it based upon a time axis.

FIG. 5 is a view similar to FIG. 4 but showing a modification in pulsing operation.

FIG. 6 is a diagram illustrating a complete system according to the present invention.

DESCRIPTION OF THE PREFERRED EMBODIMENTS

Figure 7:
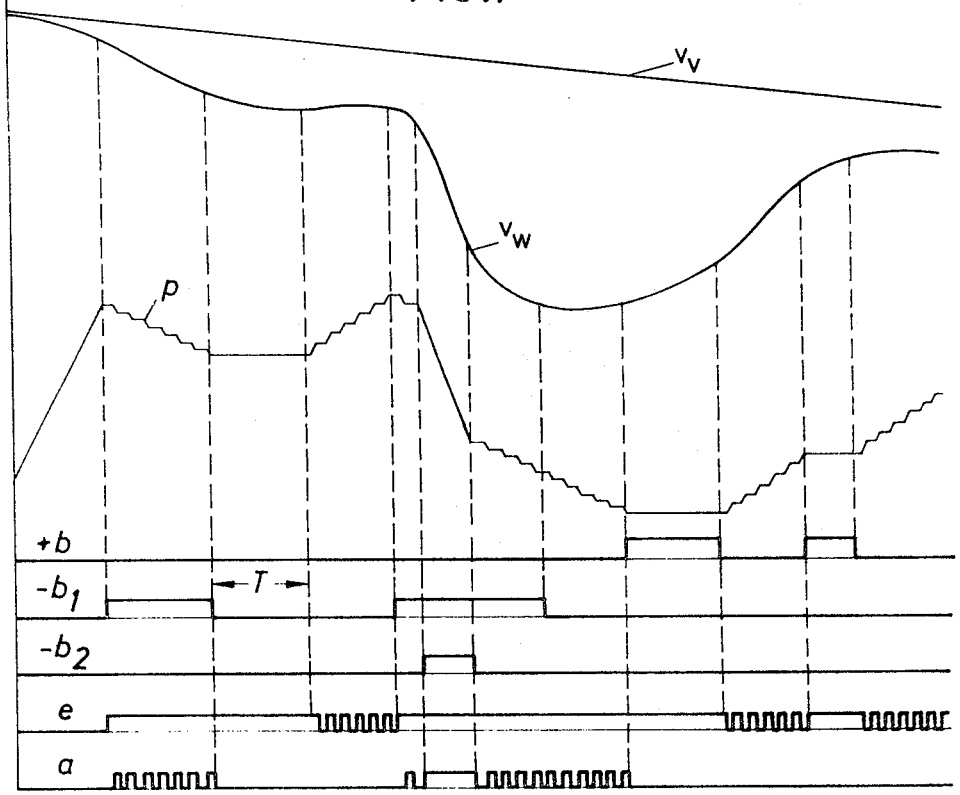
FIG. 7 is a diagram associated with FIG. 6.

Referring to FIG. 1, the portion of the braking system shown diagrammatically therein includes an inlet valve indicated generally by the reference character 1, an outlet valve indicated generally by the reference character 2, the inlet valve 1 being provided with an actuating fluid inlet 3 which may be connected through the conduit 5 not only to the outlet valve but also in pressure communication with the actuator for the vehicle brake which may take the form of a cylinder 6 and associated piston 7 as diagrammatically shown.

The inlet valve 1 is normally open under the influence of the compression spring 9 acting upon the associated valve member 8 which is urged away from the inlet end of the conduit 5 in the normal position indicated in the Figure. The outlet valve 2, on the other hand, is normally urged into its closed position as shown in FIG. 1. The two valves are each provided with an armature 10 and an associated operating winding or coil 11 or 12, respectively which, when actuated, moves its respective valve from its normal position, thus to close the inlet valve 1 and open the outlet valve 2. The outlet valve 2 is provided with a conduit 4 leading therefrom which may return the pressure fluid to a reservoir, dump it to the atmosphere, etc., but, at any rate, to provide a pressure relief action for the actuator 6, 7.

FIG. 2 illustrates the actuating fluid pressure curve $p$ as a function of time, it being appreciated that the inlet conduit 3 may be connected to any suitable source of actuating fluid under pressure, such as the master cylinder of a hydraulic brake system or the like. The pressure variations are shown as linear functions for the sake of simplicity although in an actual system these variations are more nearly exponential in form. When, by the depression of the vehicle brake pedal, the actuating fluid is pressurized, as shown in FIG. 2, both of the valves 1 and 2 are in their normal positions as indicated by the no current conditions $I_{11}$ and $I_{12}$ for the respective windings 11 and 12. When the brake is first actuated by virtue of the pressure rise shown at the left-hand side of FIG. 2, deceleration of the vehicle wheel will be effected. When the pressure reaches a predetermined value, both valves will be urged from their normal positions so that the inlet valve is closed and the outlet valve is open, allowing the pressure to decrease rapidly as illustrated.

The diagram of FIG. 2 then shows a third operating state of the valves in which the inlet valve remains closed and the outlet valve is operated in a rapidly pulsating manner. That is to say, the pulse durations of the current pulses $I_{12}$ are of much shorter duration than is the relatively long initial pulse duration which produced, in conjunction with the closed inlet valve, the rapidly decreasing pressure. These current pulses also cause rapid pressure changes, as illustrated in FIG. 2 but the cumulative and average or net pressure reduction is less rapid than the initial pressure drop.

According to the present invention, it is not intended that these rapid fluctuations due to the rapid pulsating action produce a corresponding rapidly fluctuating response by the brake mechanism and, for this reason, the pulses are produced at a frequency sufficiently high that the brake mechanism can not respond to the rapid fluctuations but respond, instead, only to the net or average pressure change. For example, the limiting frequency of a motor vehicle disc brake above which the brake mechanism can not respond faithfully may be in the order of 20 Hz. whereas the limiting frequency for present state of the art miniature magnetic valves lies usually in the range of from about 50 to about 90 Hz. Accordingly, the pulse sequence frequency according to the present invention during the rapidly fluctuating or pulsating action is chosen above the limiting frequency for the brake mechanism but below the limiting frequency of the magnetic valve or valves involved.

In the fourth operating state of the assembly of FIG. 1, both the inlet and the outlet valves are closed and the pressure remains constant as shown in the middle portion of the FIG. 2 pressure curve and, in a fifth operating stage, the outlet valve 12 remains closed and the inlet valve is operated in a rapidly pulsating manner at a pulse sequence frequency in the range described above for rapid fluctuations as indicated by the pulses at the right-hand side of FIG. 2. However, in this instance, it is to be noted that the pulses are of progressively decreasing pulse durations so that, at first, the average pressure rise to which the vehicle brake responds is rather gradual and then becomes increasingly greater until the condition is reached in which the inlet valve is once again retained in its open position and the outlet valve in its closed position so that the pressure rise is steady and is determined by the fluid pressure. The manner in which these successively decreasing pulse durations are obtained will be described hereinafter.

Referring now to FIGS. 3–5 inclusive, a three-way valve system is shown in FIG. 3 which is provided with the inlet 3 as previously described and with a pressure relief or return line 4 for controlling the pressure at the cylinder 6. The actuator for the valve of FIG. 3 is energized by a winding 13 which is electrically connected by means of the conductor 13' to the output of an OR-gate 43. The system of FIG. 3 also includes a pulse generator system 39 having different outputs connected to several AND-gates 40, 41 and 42 whose other inputs are connected to the vehicle wheel sensor so that, under certain conditions of wheel acceleration or deceleration, the high-frequency pulsating action is achieved as described hereinabove.

Generator system 39 can be composed, for example, of three astable multivibrators each producing a respectively different output pulse train. For example, the outputs could have identical pulse repetition frequencies and respectively different pulse durations, or identical pulse durations and respectively different pulse repetition frequencies, or a combination thereof. The output delivered to OR-gate 43 is determined by the AND-gates 40, 41 or 42 which is receiving a gating signal from its respective terminal 43''.

Thus, considering first FIG. 4, at the left-hand side the pressure is decreasing rapidly due to the fact that a pulse of long duration is being applied to the valve to close the inlet 3 and open the outlet 4 as indicated by the current pulse at the extreme left of FIG. 4. This signal is applied to the system through the OR-gate 43 from the conductor 43'. When the wheel deceleration reaches some predetermined threshold, the various AND-gates 40, 41 and 42 respond to inputs to one or more of the terminals 43'' from the wheel sensor and the other input from the pulse generator system 39 to produce pulsating valve actuation causing the sawtooth pressure fluctuations that are depicted in FIG. 4. As indicated in FIG. 4 by the period $n$, the pulses are of fixed frequency but, as will be noted, they may be varied as to pulse duration to cause graduations in the pressure decrease and increase, the brake mechanism being actuated in response to the average thereof. Three distinct pulse durations are shown, each derived from a different output from system 39. The intermediate pulse duration is selected to maintain a constant average pressure.

FIG. 5 shows a modification of the principle illustrated in FIG. 4 wherein it will be noted that the pulse durations $m$ are fixed whereas the frequency of the pulses is varied between three values to again achieve the graduations of net or average pressure increase or decrease. The manner in which the two pulse systems of FIGS. 4 and 5 are achieved will be described hereinafter. In any event, they basically emanate from the signal generator system 39 as will hereinafter appear.

Referring now to the system shown in FIG. 6, the vehicle wheel W will be seen to include a brake mechanism 28 to which pressure may be applied from the master cylinder 27, through the inlet valve 1, so as to cause brake actuation. The outlet valve 2 returns the fluid through the pump 29 and suitable check valve 30 to the main line and the inlet and outlet valves 1 and 2 are provided with the windings or coils 11 and 12 for actuating these valves from their normal state. In this regard, it is to be noted that the inlet and outlet valves 1 and 2 are of the form described in conjunction with FIG. 1 hereinabove.

The energy to actuate the windings 11 and 12 is taken from the respective power amplifiers 32 and 31 to which the output conductors $e$ and $a$ respectively are connected, as shown. Signals are applied to the respective conductors $a$ and $e$ through the OR-gates 21 and 22, one input to each of these OR-gates being from a respective one of the pulse generators 23 and 24 which, as shown, are astable multivibrators which are driven when their respective input terminals 36 or 33 are energized in a fashion hereinafter described. Terminal 36 is also connected to a second input of OR-gate 22. Two further inputs to the OR-gate 22 are connected to terminal 34 at the output of an AND-gate 18 and at the output of a monostable device 19.

The wheel sensor means 14 is shown diagrammatically and the dashed connection 28a is intended to indicate that the outputs $-b$, $-b_1$ and $-b_2$ are controlled in accordance with the rotational behavior of the wheel. Such wheel sensor means are conventional. A preferred embodiment is illustrated and described in the U.S. Pat. No. 3,017,145 granted to Gordon W. Yarber. Referring to FIG. 5 of that patent comparable acceleration, first deceleration and second deceleration outputs appear in the lines 390, 216 and 229 respectively.

The brake light system includes the stop switch 25 actuated when the master cylinder 27 is actuated and the brake light 26. A reset conductor 16' for a bistable device 16 is connected in this circuit such that when the brakes are operated, the reset potential for device 16 is clamped to ground so that the other input 16'' for the bistable device 16 may be effective to produce an output at the terminal 33. The $+b$ output of the sensor 14 at which a signal appears only as long as the wheel acceleration exceeds a predetermined lower threshold value but remains below a predetermined upper threshold value, is connected both to one input of an AND-gate 18 and to the reset input of a bistable device 15, the other input of the AND-gate 18 being connected to the output of the bistable device 16. The reset output of bistable device 15 is connected to one input of an AND-gate 17 and the other input of the AND-gate 17 is connected to the $-b_1$ output of the sensor 14, at which a signal appears when the wheel deceleration reaches a first threshold value. The $-b_1$ output of sensor 14 is also connected to input line 16'' of device 16 and to one input of an OR-gate 20 whose output is connected to terminal 36. The other input of OR-gate 20 is connected to the other output of device 15.

The other input to the bistable device 15 is connected to the $-b_2$ output of the sensor 14 at which a signal appears when the wheel deceleration reaches a second threshold value and this signal is also applied through a terminal 37 to the previously mentioned OR-gate 21.

The initial condition of the system is as is shown in FIG. 6, a positive voltage reset signal being applied at 16' and the normal output of the bistable device 16 being to that terminal to which the terminal point 33 is not connected, and the bistable device 15 being in the state in which it applies an output to the AND-gate 17. When the brake system is operated and the brake light switch 25 is closed, the reset signal is removed from the conductor 16' and, upon attainment of the first threshold of wheel deceleration whereby a signal appears at the output $-b_1$, the AND-gate 17 passes the signal and, through the monostable device 19, passes the signal to the terminal 35 and then through the OR-gate 22 and the power amplifier 32 to close the normally open inlet valve. At the same time, the $-b_1$ output passes through OR-gate 20 so that, at the terminal 36, the astable device 23 is excited to produce a pulse train output which passes through OR-gate 21 and through the amplifier 31 to be applied to the outlet valve 2 so that the outlet valve is operated in a pulsating fashion as previously described. This action is shown at the left-hand side of FIG. 7 and shows the stepped decreasing pressure response as indicated. In FIG. 7, the curve $v_r$ is the linear velocity of the vehicle whereas the curve $v_w$ is the peripheral velocity of the wheel.

As soon as the $-b_1$ output signal disappears, by virtue of the wheel accelerating slightly as the result of a gradual decrease in the pressure P due to the pulse output at the conductor $a$, the pressure assumes a constant value and remains constant for the time T, as indicated. This time T corresponds to the period of time subsequent to termination of the signal $-b_1$ that the monostable device 19 continues to produce a pulse which it applies to the terminal 35. During all this time, the signal generator 24 is continuing to produce a pulse train output which passes through the gate 22 and is applied to the conductor $e$ but this pulse train output is overridden by the output of the monostable device 19 until the latter returns to its stable state, at which time the pulse train output is effective to operate the inlet valve 1 in a rapidly fluctuating or pulsating manner as indicated in FIG. 7 for the period of time just subsequent to the time period T. This will produce the gradual step pressure rise illustrated.

This pulsating action of the inlet valve 1 produces a slow brake pressure increase and continues until the wheel again decelerates sufficiently to produce the output $-b_1$, at which point the pulsating output from the signal generator 24 is again overridden by an output signal from device 19 as shown in FIG. 7 and, at the same time the $-b_1$ output is passed through OR-gate 20 and actuates the signal generator 23 again to start a pulsating action of the outlet valve 2. At this point, as can be seen from the wheel peripheral velocity curve $v_w$, the wheel is rapidly decelerating and it then reaches the second threshold value of wheel deceleration at which time a signal appears at the $-b_2$ output of the sensor 14, so that the state of the bistable device 15 is switched to maintain the astable device 23 in operation, but this action being overridden by the output signal to the terminal point 37 which passes through OR-gate 21 and is applied to maintain the outlet valve 2 in its open position. As soon as the wheel starts to accelerate, the threshold signal $-b_2$ is removed, the output valve 2 is again returned to pulsating operation and, subsequently, the wheel accelerates past the threshold value $-b_1$ so that this output also ceases. However, the bistable device 15 continues to deliver an output signal to OR-gate 20 so that the outlet valve remains in pulsating condition and the inlet valve remains closed.

Thereafter, the wheel accelerates to a point at which the wheel acceleration threshold value $+b$ is attained to produce a signal which resets the bistable device 15 to its normal reset state to cease pulsating operation of the outlet valve and which, at the same time permits the output signal of the bistable device 16 to pass through AND-gate 18 to retain the inlet valve 1, through the OR-gate 22, in its closed position. At this time the pressure remains constant so that the wheel continues to accelerate. When the wheel acceleration exceeds the upper threshold value, the output signal $+b$ disappears, the bistable device 16 still remains in the condition in which the signal generator 24 is energized so that the inlet valve 1 continues to operate in a pulsating fashion, as indicated, to increase the average pressure to which the brake device responds so that the wheel acceleration decreases and the output signal at $+b$ once again appears, as illustrated in the right-hand portion of FIG. 7. Again, the pressure remains constant until this signal disappears as a result of a continued decrease in wheel acceleration below the lower acceleration threshold value and then the pressure gradually rises due to the pulsating action of the inlet valve 1. When the brake peddle is released, the switch 25 is opened and allows the bistable device 16 to be reset to its normal condition in which the signal device 24 is not excited.

Figure 8:
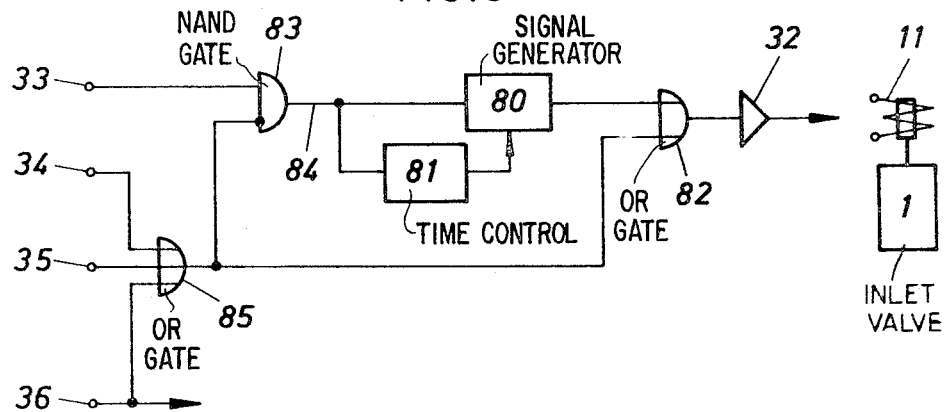
FIG. 8 is a circuit diagram of a control channel for varying the pulsing characteristics of the circuit of FIG. 6 as a function of time.

FIG. 8 shows means by which the system may be adapted for either variation of the duration of the high-frequency pulses with decreasing time duration of the pulses or whereby the pulse durations may be retained constant with varying frequency as is described in conjunction with FIGS. 2, 4 and 5 hereinabove.

In this system, a NAND-gate 83 is provided with its positive input connected to a terminal 33 and its negated input connected to an OR-gate 85 whose inputs are connected to terminals 34, 35 and 36. When the terminal 33 is energized and none of the points 34, 35 and 36 are energized, an output will be produced at the conductor 84 which energizes a signal generator 80 to produce a pulse output. The signal on conductor 84 is also applied to the time control 81, which modifies the output of the signal generator 80 in one of the above described fashions. This output is applied to the OR-gate 82 and to the power amplifier 32 to control the winding 11 of the inlet valve 1, in the specific embodiment shown. When any one of the terminal points 34, 35 or 36 is energized, the output of the OR-gate 85 will block the NAND-gate 83 even if the output 33 is still present and the output of the OR-gate 85 is passed through the gate 82 to the power amplifier 32. Thus, the system operates to provide variation in the duty cycle, or ratio of pulse duration to subsequent pulse interval, so that pressure changes may be tailored as desired as a function of time subsequent to energization of the signal generator. For example, the pulse generator may begin operation by producing pulses having a relatively long duration and the time control 81 then causes the pulse durations to become progressively shorter while the pulse repetition frequency remains constant.

While any suitable form of signal generator 80 and time control 81 functioning as hereinabove described may be employed, a preferred joint embodiment of these two devices is the pulse generator illustrated and described in copending application of Ralph W. Carp, Dewey W. Eppley and Donald W. Howard, Ser. No. 673,651, filed Oct. 9, 1967, now U.S. Pat. No. 3,499,689.

It will be understood that the above description of the present invention is susceptible to various modifications, changes and adaptations, and the same are intended to be comprehended within the meaning and range of equivalents of the appended claims.

We claim:

1. An antilocking pressure actuated vehicle brake system including a wheel having a brake, actuator means for said brake, a source of pressurized fluid, at least one magnetic valve connected between said actuator means and said source for controlling said actuator means, and control means for said valve including sensor means responsive to the rotational behavior of said wheel, said control means generating control signals for causing the fluid pressure applied to the brake to be selectively rapidly decreased, held substantially constant, or rapidly increased, the improvement wherein:

said control means further includes current pulse generating means for generating pulsed control signals, in addition to the above-defined control signals, for a given time duration, said pulsed control signals selectively effecting a reduction in the rate of at least one of said rapid pressure decrease and pressure increase, or a maintenance of said constant pressure, resulting from said control signals.

2. The antilocking brake system as defined in claim 1, wherein said sensor means has three outputs dependent, respectively, upon attainment of a first threshold of wheel deceleration, a second threshold of wheel deceleration, and a threshold of wheel acceleration, and wherein this ratio of control pulse duration to subsequent control pulse interval alternates between discrete values determined by said outputs.

3. The antilocking brake system as defined in claim 2, wherein said ratio alternates under the influence of the control signals between values of zero, at least one finite value, and infinity.

4. The antilocking brake system as defined in claim 2 including means for continuously varying said ratio dependent on said rotational behavior of said wheel.

5. The antilocking brake system as defined in claim 1 wherein said valve controls the inlet to said actuator means and is normally closed, said sensor means having an output for opening said valve for relatively long periods whereby the pressure increases rapidly at said actuator means, said sensor means having another output during which said pulse-generating means produces a less rapidly increasing pressure.

6. The antilocking brake system as defined in claim 1 wherein said valve controls the outlet from said actuator means and is normally closed, said sensor means having an output for opening said valve for relatively long periods whereby the fluid pressure at said actuator means decreases rapidly, said sensor means having another output during which said pulse-generating means produces less rapidly decreasing pressure.

7. The antilocking brake system as defined in claim 1 wherein said valve is a three-way valve which in one position effects a reduction in brake pressure and in another position effects an increase in brake pressure.

8. The antilocking brake system as defined in claim 1 wherein said pulse-generating means is actuated only during certain outputs from said sensor means, and said system including a time control for varying said ratio as a function of time from the beginning of pulse generator means operation.

9. In a vehicle antilocking brake system as defined in claim 8 including means for varying the actuating duty cycle of said pulsing.

10. The antilocking control system as defined in claim 1, wherein the ratio alternates under the influence of the control signals of the sensor means between discrete, fixed values.

11. In a vehicle antilocking brake system of the type including a wheel, a braking device for said wheel, a source of pressurized actuating fluid for said braking device, valve means for selectively admitting pressurized fluid to and dumping pressurized fluid from said braking device, and sensor means for controlling said valve means in accord with predetermined changes in angular velocity of said wheel, the improvement which comprises:

means responsive to at least one condition of wheel angular velocity change for pulsing said valve means to effect a rapidly fluctuating net change in fluid pressure at said braking device, and responsive to at least one other condition of wheel angular velocity change for pulsing said valve means to effect a less rapidly fluctuating net change in fluid pressure at said braking device, in which the frequency of such pulsing is greater than the frequency limit at which said braking device may respond to pressure changes, whereby said braking device responds to the average of said net change.

12. An antilocking control system for a vehicle brake system responsive to pressure variations in an actuating fluid, said brake system being incapable of responding to pressure variations above a predetermined frequency, said control system comprising, in combination;

valve means for selectively increasing and decreasing actuating fluid pressure applied to said brake system, and control means for pulsing said valve means for durations both greater and less than the period of said predetermined frequency to produce, respectively, rapid and less rapid changes in actuating fluid pressure to which said brake system responds.

13. The antilocking control system as defined in claim 12, including means for varying the actuating duty cycle of said pulsing when said durations are of lesser value than the period of said predetermined frequency.

14. An antilocking control system for a vehicle brake system including a wheel having a brake, actuator means for said brake, a source of pressurized fluid, an inlet and outlet valve connected between said actuator means and said source for controlling said actuator means and control means for said valve including sensor means responsive to the rotational behavior of said wheel, said control means generating control signals for causing the fluid pressure applied to the brake to be selectively rapidly decreased, held substantially constant or rapidly increased, the improvement wherein said control means further comprises:

a pulse generator means for said inlet valve;

a pulse generator means for said outlet valve;

first gate means;

means connecting said sensor means and said inlet pulse generator means to each other and to said first gate means, said first gate means selectively delivering to said inlet valve pulsed control signals;

second gate means; and means connecting said sensor means and said outlet pulse generator means to each other and to said second gate means, said second gate means selectively delivering to said outlet valve pulsed control signals.

* * * * *